US009439399B2

(12) United States Patent
Rubinstein et al.

(10) Patent No.: US 9,439,399 B2
(45) Date of Patent: Sep. 13, 2016

(54) ANIMAL SUPPORT HARNESS AND METHOD OF SUPPORTING AND RESTRAINING MOVEMENT OF THE ANIMAL

(71) Applicant: GingerLead, LLC, Denver, CO (US)

(72) Inventors: Elizabeth Dorothy Rubinstein, Denver, CO (US); Barry Scott Rubinstein, Denver, CO (US)

(73) Assignee: GINGERLEAD, LLC, Denver, CO (US)

( * ) Notice: Subject to any disclaimer, the term of this patent is extended or adjusted under 35 U.S.C. 154(b) by 0 days.

(21) Appl. No.: 13/664,730

(22) Filed: Oct. 31, 2012

(65) Prior Publication Data

US 2013/0055966 A1     Mar. 7, 2013

Related U.S. Application Data

(60) Continuation of application No. 13/433,564, filed on Mar. 29, 2012, which is a division of application No. 12/143,444, filed on Jun. 20, 2008, now Pat. No. 8,171,891.

(51) Int. Cl.
| | |
|---|---|
| *A01K 27/00* | (2006.01) |
| *A01K 29/00* | (2006.01) |
| *A01K 1/02* | (2006.01) |
| *A61D 3/00* | (2006.01) |

(52) U.S. Cl.
CPC ........... *A01K 27/002* (2013.01); *A01K 1/0263* (2013.01); *A61D 3/00* (2013.01)

(58) Field of Classification Search
CPC ..... A01K 27/002; A01K 27/003; A61D 3/00
USPC ........ 119/725–729, 712, 817, 818, 850, 856, 119/770, 771, 793, 792
IPC ................................. A01K 15/00,15/02, 27/00
See application file for complete search history.

(56) References Cited

U.S. PATENT DOCUMENTS

| | | | |
|---|---|---|---|
| 136,059 | A | 2/1873 | Hohorst |
| 1,595,834 | A | 3/1926 | Griffiths |
| 3,895,628 | A | 7/1975 | Adair |

(Continued)

FOREIGN PATENT DOCUMENTS

| | | |
|---|---|---|
| GB | 2184091 | 6/1987 |
| JP | 2007-159441 | 6/2007 |
| WO | WO 2004/054355 | 7/2004 |

OTHER PUBLICATIONS

Machine Translation of JP 2003245025 (PDF).*

(Continued)

*Primary Examiner* — Shadi Baniani
(74) *Attorney, Agent, or Firm* — Sheridan Ross PC (57) ABSTRACT

An animal support harness and method of supporting and restraining movement of an animal is provided. The apparatus includes a sling that can be routed around the abdomen of the animal, and a plurality of primary support straps extend and are joined at a handle. A leash strap is integrated with the handle, and extends to connect to the collar of the animal. The integral leash strap along with the primary support straps enables an owner to control not only an upward supporting force for the animal, but also provides an inherent restraint to prevent an animal from walking too quickly or lunging, which might otherwise harm the animal.

5 Claims, 5 Drawing Sheets

(56) References Cited

U.S. PATENT DOCUMENTS

| | | | |
|---|---|---|---|
| 4,530,309 | A | 7/1985 | Collins |
| 4,559,906 | A | 12/1985 | Smith |
| 4,577,591 | A | 3/1986 | Wesseldine |
| 4,644,902 | A | 2/1987 | Doyle |
| 4,655,172 | A | 4/1987 | King |
| 5,146,875 | A | 9/1992 | Bolt |
| D330,273 | S | 10/1992 | Cernek |
| 5,165,222 | A * | 11/1992 | Cohen et al. ............... 54/79.2 |
| 5,193,486 | A | 3/1993 | Kitchens |
| 5,632,235 | A | 5/1997 | Larsen et al. |
| 5,738,043 | A | 4/1998 | Manuel |
| 5,791,295 | A | 8/1998 | Schmid et al. |
| 5,845,606 | A | 12/1998 | Hartman |
| 6,085,694 | A | 7/2000 | Simon |
| 6,101,979 | A | 8/2000 | Wilson et al. |
| 6,123,049 | A | 9/2000 | Slater |
| 6,161,505 | A | 12/2000 | Noguero |
| 6,216,636 | B1 | 4/2001 | Butchko |
| 6,234,117 | B1 | 5/2001 | Spatt |
| 6,450,130 | B1 | 9/2002 | Goldberg |
| 6,571,745 | B2 | 6/2003 | Kerrigan |
| 6,595,162 | B1 | 7/2003 | Hibbert |
| 6,631,697 | B1 | 10/2003 | Solze |
| 6,637,377 | B2 | 10/2003 | Lobanoff et al. |
| 6,694,921 | B2 | 2/2004 | Emerick |
| 6,729,268 | B1 | 5/2004 | Costell |
| 6,880,489 | B2 | 4/2005 | Hartmann et al. |
| 6,912,976 | B2 | 7/2005 | Everett |
| D510,160 | S | 9/2005 | Rominger |
| 7,044,087 | B1 | 5/2006 | Brecheen |
| 7,107,940 | B2 | 9/2006 | Abinanti |
| 7,281,363 | B2 | 10/2007 | Woerner |
| 7,284,504 | B1 | 10/2007 | Purschwitz, Jr. et al. |
| 7,325,516 | B2 * | 2/2008 | Moore ........................ 119/850 |
| 7,343,881 | B2 | 3/2008 | Schantz et al. |
| 7,353,779 | B2 | 4/2008 | Altieri |
| 8,015,948 | B2 | 9/2011 | Hall |
| 8,171,891 | B2 | 5/2012 | Rubinstein et al. |
| 2005/0229869 | A1 | 10/2005 | Leo |
| 2005/0263102 | A1 | 12/2005 | Sherman et al. |
| 2005/0263104 | A1 | 12/2005 | Lazarowich |
| 2007/0113798 | A1 | 5/2007 | Torjesen |
| 2008/0276880 | A1 * | 11/2008 | Swisher et al. ............... 119/728 |
| 2012/0180735 | A1 | 7/2012 | Rubinstein et al. |

OTHER PUBLICATIONS

Back Harness, In the Company of Dogs, Summer Preview Catalog 2008, 1 page.

Bottoms Up Leash, www.dog.com, on or before Jun. 21, 2009, 1 page.

ComfortLift Carrier, Doctors Forster and Smith, p. 157, on or before Jun. 21, 2009.

Guardian Gear Lift & Lead Harness, Pet Edge, www.petedge.com, Nov. 11, 2006, pp. 1-8.

Hip Assist Harness, Orvis: The Dog Book Fall 2008, 1 page.

Levy, "Harness that helps dogs to walk again," Daily Mail, Mar. 20, 2012, pp. 23-24.

Mobility Belly Sling, In the Company of Dogs, Summer Preview Catalog 2008, 1 page.

Mobility Harness, In the Company of Dogs, Summer Preview Catalog 2008, 1 page.

Pet-Lift™, DogLeggs, available at www.dogleggs.com/files/surgisox/petlift.cfm, accessed Apr. 8, 2009, pp. 1-2.

Ruff Wear Web Master Dog Harness, available at www.trails.com/gear/p/ruff-wear/web-master-dog-harness/, accessed Apr. 8, 2009, pp. 1-3.

The Help'Em Up Harness, Blue Dog Designs, available at www.helpemup.com/flashmovie.html, accessed Apr. 8, 2009, pp. 1-2.

Walk-A-Bout-Harness, UPCO, available at www.upco.com/walk-a-bout-harness-larg-24-31, accessed Apr. 8, 2009, 1 page.

* cited by examiner

ANIMAL SUPPORT HARNESS AND METHOD OF SUPPORTING AND RESTRAINING MOVEMENT OF THE ANIMAL

REFERENCE TO RELATED CASES

This application is a continuation of U.S. patent application Ser. No. 13/433,564 filed on Mar. 29, 2012, which is a divisional application of U.S. patent application Ser. No. 12/143,444 filed on Jun. 20, 2008, now U.S. Pat. No. 8,171,891, each of which are incorporated herein in their entirety.

FIELD OF THE INVENTION

This invention relates generally to an apparatus for supporting an animal, and more particularly, to an animal support harness particularly suited for assisting a four-legged animal who is convalescing or suffering from an ailment and requires some support and restraint.

BACKGROUND OF THE INVENTION

An animal having an injury or ailment may require some assistance in supporting a percentage of its body weight when the animal walks or when the animal is undergoing therapy. There are a number of joint ailments that four legged animals such as dogs may suffer, such as hip dysplasia. Dysplasia is considered to be a condition caused by improper growth of hip joint components, and may require surgery and extensive rehabilitation. For those animals that have undergone surgery, or animals that have suffered a debilitating injury, it is advantageous to provide a support harness that can be used by an owner to support the weight of the animal.

There are a number of devices known to assist a convalescing or injured animal by provision of a harness or sling that is routed around the trunk or mid-section of the animal's body. One example of such a harness is the U.S. Pat. No. 6,631,697 that discloses a support member and two handles attached to opposite ends of the support member. When a lifting force is applied to the handles, the weight of the dog is partially supported and partially transferred to the support member resulting in the necessary support for the animal.

U.S. Pat. No. 6,216,636 discloses an apparatus for lifting and assisting convalescent pets characterized by a sling portion connected to two opposing handle grips. The sling portion is disposed under the chest or abdomen of the animal, and the handle grips grasped by the owner help to support or lift the pet.

U.S. Pat. No. 7,284,504 discloses a method of carrying and assisting the movement of a dog by provision of an apparatus having a carrying strap routed over the back of the animal. Front leg straps are provided and connect to a forward portion of the carrying strap. A coupling assembly is provided for attaching the front leg straps to the carrying strap. The device further includes a pair of rear leg straps attached to a rear portion of the carrying strap by another coupling assembly.

U.S. Pat. No. 6,880,489 discloses a prosthetic device suitable for treating canine hip dysplasia and lumbo-sacral disorders, and discloses a method of use. The device includes a harness with rear right and left braces, the rear braces including corresponding straps that encircle the legs of the canine. The braces are engagable to apply force to persuade the hips towards a more natural position. A tether between the harness and the complimentary rear braces draws the right and left braces forward.

U.S. Pat. No. 5,845,606 discloses a pet mobility aid for four-legged pets characterized by a central strap extending longitudinally between a forward and rear end for placement along the back of the animal. A forward strap assembly attaches to the forward end of the central strap adjacent the front legs of the animal. A rear strap assembly affixes to the rear end of the central strap adjacent the hind legs. A handle extends along and couples with a rear portion of the central strap.

While these prior art devices and methods may be adequate for their intended purposes, there is still a need to provide a relatively simple, yet effective support harness that not only supports a designated portion of the animal's body, but also incorporates a feature to control the speed of the animal walking. Many veterinary professionals continue to use an old, traditional method of supporting an animal by use of a common household bath towel that is slung beneath the animal's abdomen, and the owner then grasps the joined ends of the towel. Obviously, this method of supporting a dog is less than optimal, and precise control and stability are clearly not capable of being obtained by this traditional method.

The shortcomings of the prior art are overcome by the apparatus and method of the present invention as detailed below.

SUMMARY OF THE INVENTION

The present invention provides an animal support harness and method of supporting and restraining movement of the animal. With respect to the apparatus of the present invention, it comprises a padded sling that is routed under the abdomen of the animal, and is particularly suited for supporting the hind legs or rear portion of the animal. Each end of the sling includes a pair of primary support straps terminating in looped ends. One of the looped ends attaches to a flexible, padded and conforming handle that is used to secure the looped ends together by wrapping the handle around the looped ends of both pairs of support straps. A leash strap is also provided and has a proximal end attached to the handle, and a distal end that is adapted to attach to the animal's collar. By provision of a handle that attaches to both the leash strap and the primary support straps, simultaneous control of not only lift support, but also of restraining the forward movement of the animal are achieved. The leash strap as well as the primary support straps are adjustable so that the owner may control the animal at a comfortable position taking into account the height of the animal, as well as the height of the owner. When the support harness is secured to the animal, the primary support straps extend substantially vertically to the owner's hand, while the leash strap extends angularly forward of the owner and attaches to the animal's collar. From a side view, the back of the animal, the leash strap, and the vertically extending primary straps form a triangular shape.

Preferably, the leash strap remains taut and extends above and not in contact with the animal. The leash strap may be selectively disengaged from the harness by incorporation of a releasable buckle located on the leash strap.

The support pad in a first embodiment has a substantially rectangular shape wherein the opposite side edges of the sling extend substantially parallel to one another, and the opposite ends terminate at right angles with respect to the side edges. The support straps may be routed through channels that are sewn adjacent the opposite side edges of the sling. The support straps are slidable within the channels, and the lengths of the support straps can be adjusted by strap adjusters integrated with the straps.

In another embodiment of the present invention, the shape of the sling can be modified to accommodate male genitalia. Accordingly, the sling may have a cut-out or notch formed on one side edge of the pad to therefore avoid contact with the male genitalia that is allowed to protrude naturally outward beyond the sling.

Other features and advantages of the present invention will become apparent from a review of the following detailed description, taken in conjunction with the drawings.

DETAILED DESCRIPTION OF THE PREFERRED EMBODIMENT

Figure 1:
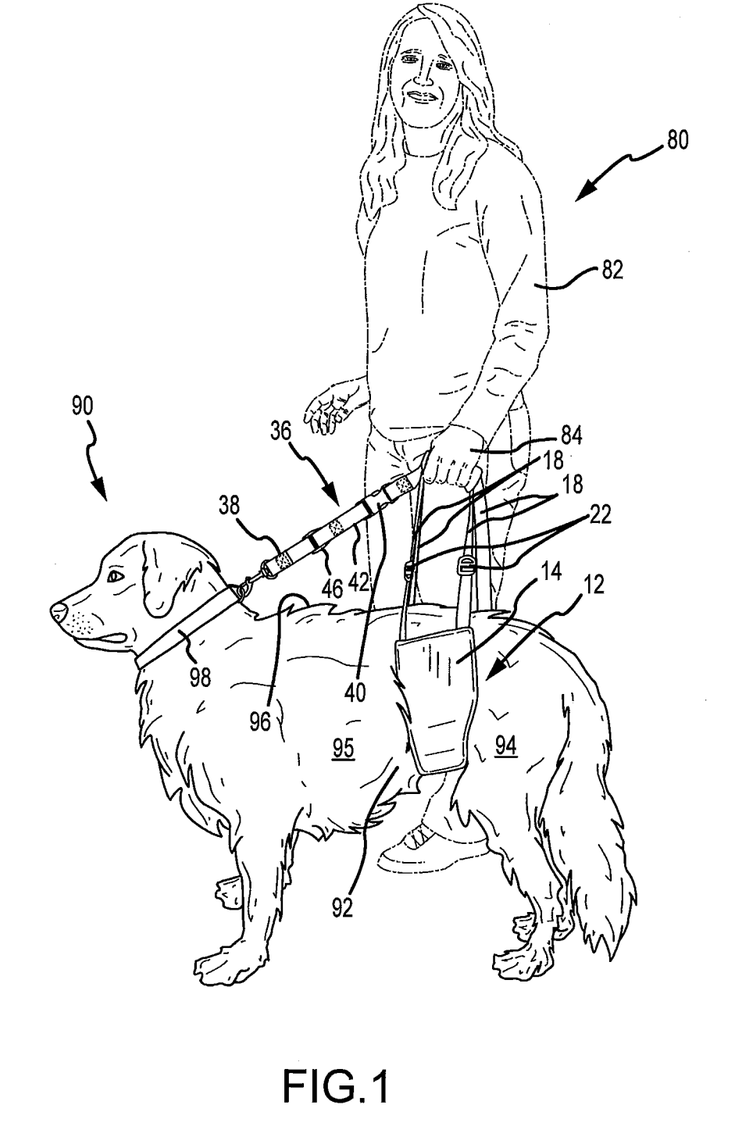
FIG. 1 is a perspective view of the harness of the present invention in a first embodiment secured on a dog.
Figure 2:
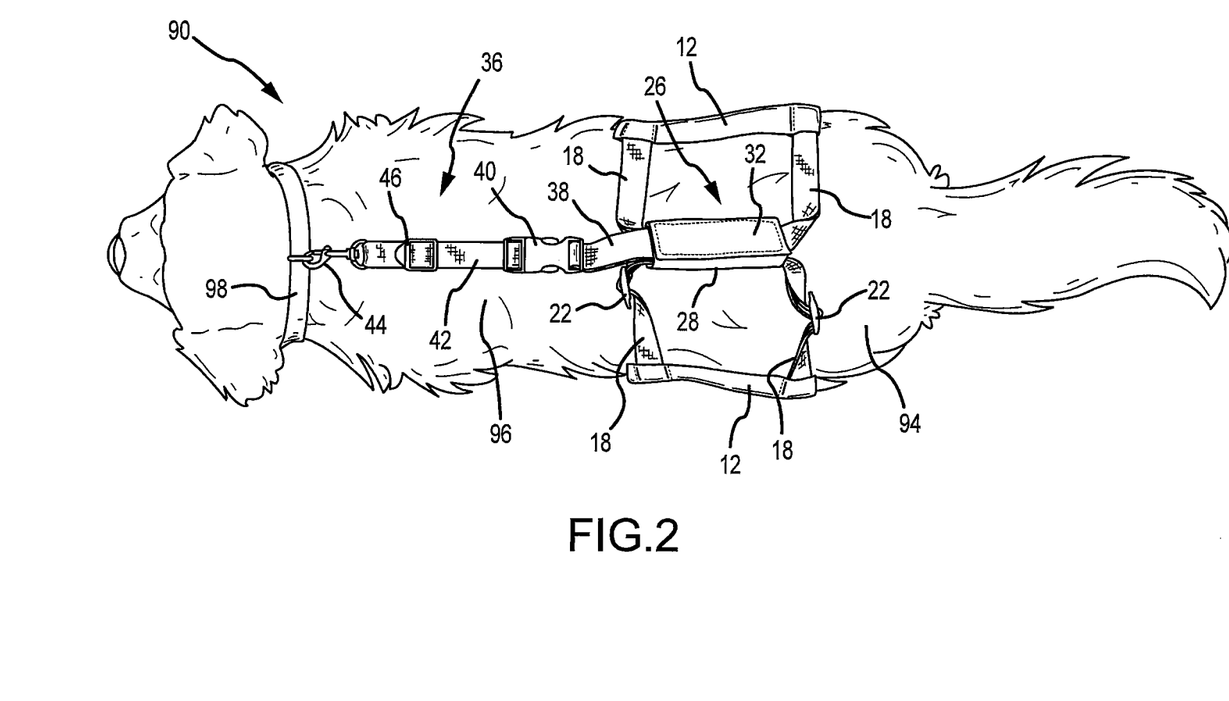
FIG. 2 is a top view of the harness of FIG. 1 illustrating the symmetrical nature of how the primary support straps extend above the animal, as well as the manner in which the leash strap extends longitudinally along the animal's back.
Figure 3:
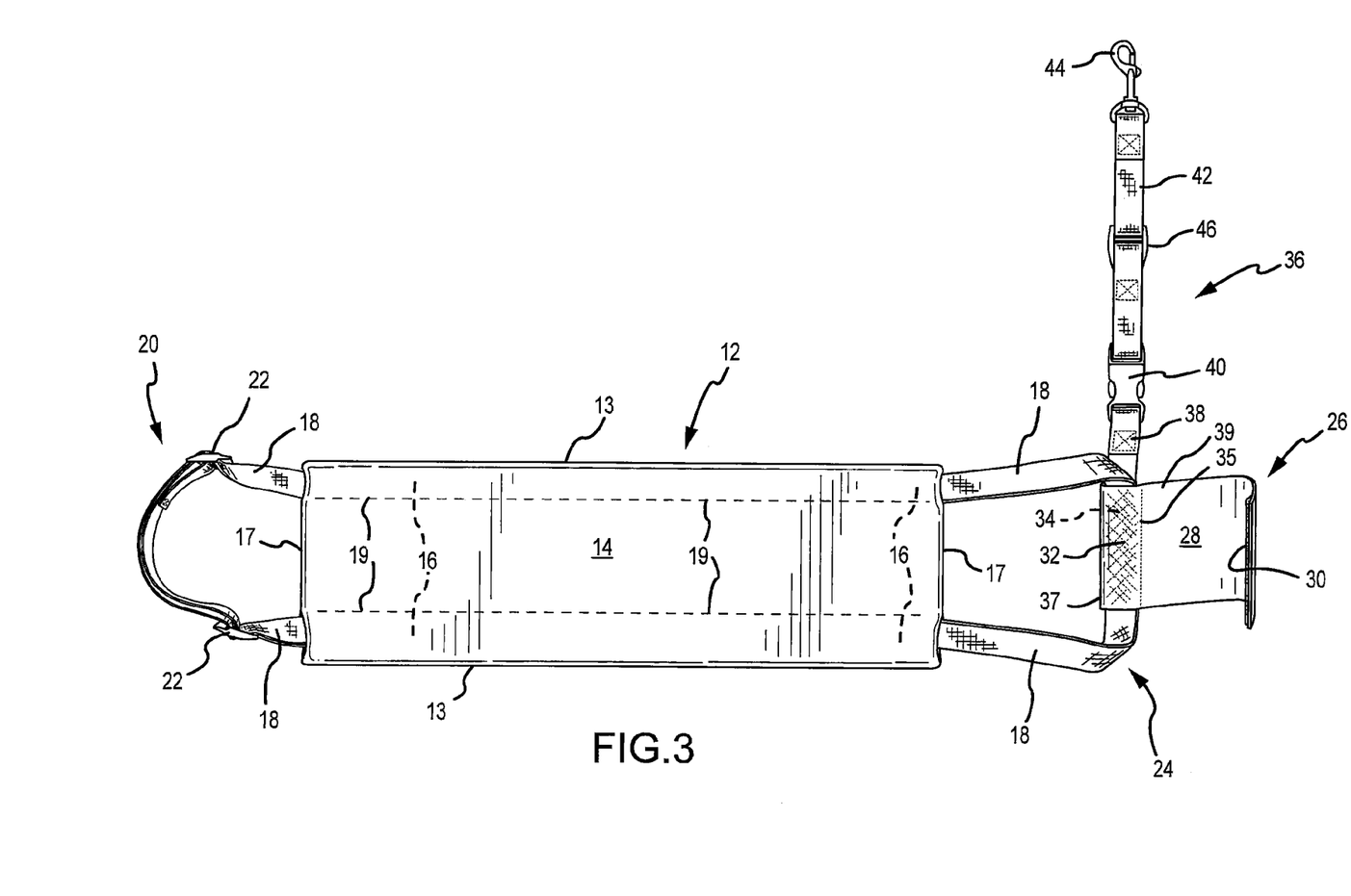
FIG. 3 is a plan view of the harness of FIG. 1 removed from the animal to better illustrate various structural details.

Referring to FIGS. 1-2, the animal support harness apparatus of the present invention is illustrated as being secured to an animal, such as a dog 90. Referring also to FIG. 3, the animal support harness is characterized by a sling 12 and a plurality of primary support straps 18 that extend away from opposite ends of the sling 12. The support straps 18 terminate in respective looped ends 20 and 24. The sling 12 includes a pad 14 that contacts the abdomen of the animal. The pad 14 has two sides, and the side in contact with the animal may have a padded layer such as a layer of cotton or other cloth material. The base layer of the pad may include a resilient, flexible material such as rip-stop nylon. The pad 14 may have a substantially rectangular shape defined by opposed parallel side edges 13 and ends 17 that are formed at right angles with respect to the parallel side edges 13. The primary support straps 18 may be routed through channels 16 that are sewn in the sling 12. The channels 16 extend the length of the sling 12, and the width of the channels are defined as the distance between the respective stitch lines 19 and the closed side edges 13. The looped end 20 may have a pair of strap length adjustors 22 incorporated thereon to allow the owner to adjust the length of the looped end 20. By providing a strap length adjustor 22 on both sides of the looped end 20, the overall length of the support straps 18 may be adjusted to accommodate the particular height at which the owner's hand will grasp the handle 26, based upon the height of the owner as well as the height of the animal. The opposite looped end 24 is secured to the handle 26. The handle 26 comprises a rectangular shaped hand pad 28 that may be made of the same material as the base layer of the sling 12. The hand pad 28 also includes a channel 34 formed therein that allows the looped end 24 to traverse through the channel 34. Stitch line 35 and side edge 37 define the width of the channel 34. Mounted on the surface of the hand pad at the location of the channel 34 is securing material, such as hook/pile material 32. A complementary securing material 30 is secured to the opposite side of the hand pad such that when the hand pad 28 is formed in a loop, the complementary sections of hook/pile material 30 and 32 contact one another and remain attached. When the harness is in use, the looped end 20 is placed in the central area of the hand pad 28, and the handle is then closed by rotating the hook/pile material 30 in contact with hook/pile material 32. Since the handle 26 is flexible, it conforms to the owner's hand.

A leash strap 36 is provided, and is connected to the handle 26 along side edge 39 or within the channel 34. The leash strap 36 includes a short connecting section 38 that attaches along the side edge 39, a long section 42, and a releasable buckle 40 interconnecting sections 38 and 42. The releasable buckle 40 enables separation of the leash strap from the harness in the event an owner only wishes to control the upper lifting support for the animal. The distal end of the long section 42 includes a snap hook 44 that may conveniently attach to the collar 98 of the animal. A strap length adjustor 46 is also provided on the leash strap 36 that allows the owner to adjust the length of the leash strap to accommodate the particular animal.

Referring back to FIG. 2, from a top view, it is shown that the leash strap 36 extends longitudinally over the animal's back 96. The support straps 18 extend upwards and are joined to one another in a symmetrical fashion from the lateral sides of the animal towards the handle 26 where the loops 20 and 24 are joined within the handle. When viewing the attached support harness from the side as shown in FIG. 1, a triangular shape is formed by the animal's back 96, the leash strap 36, and the front pair of support straps 18.

In order to best support the hind legs or rear portion of the animal's spine, the harness of the present invention is preferably mounted to the animal such that the sling 14 resides around the animal's abdomen 92, in front of the hips 94 of the animal, and behind the rib cage 95 of the animal. The pad 14 preferably encompasses contact with the animal such that the lower ends of the straps 18 do not contact the animal and extend unimpeded above the animal. The straps 18 extend substantially vertically when lifted upon by the owner, and are joined together within the handle 26 as previously described. The leash strap 36 extends forward of the supporting straps 18, and preferably along the centerline of the animal's back. However, the owner may wish to more naturally allow the leash strap 36 and the supporting straps 18 to shift to the side of the animal towards the owner who is holding the handle.

Figure 4:
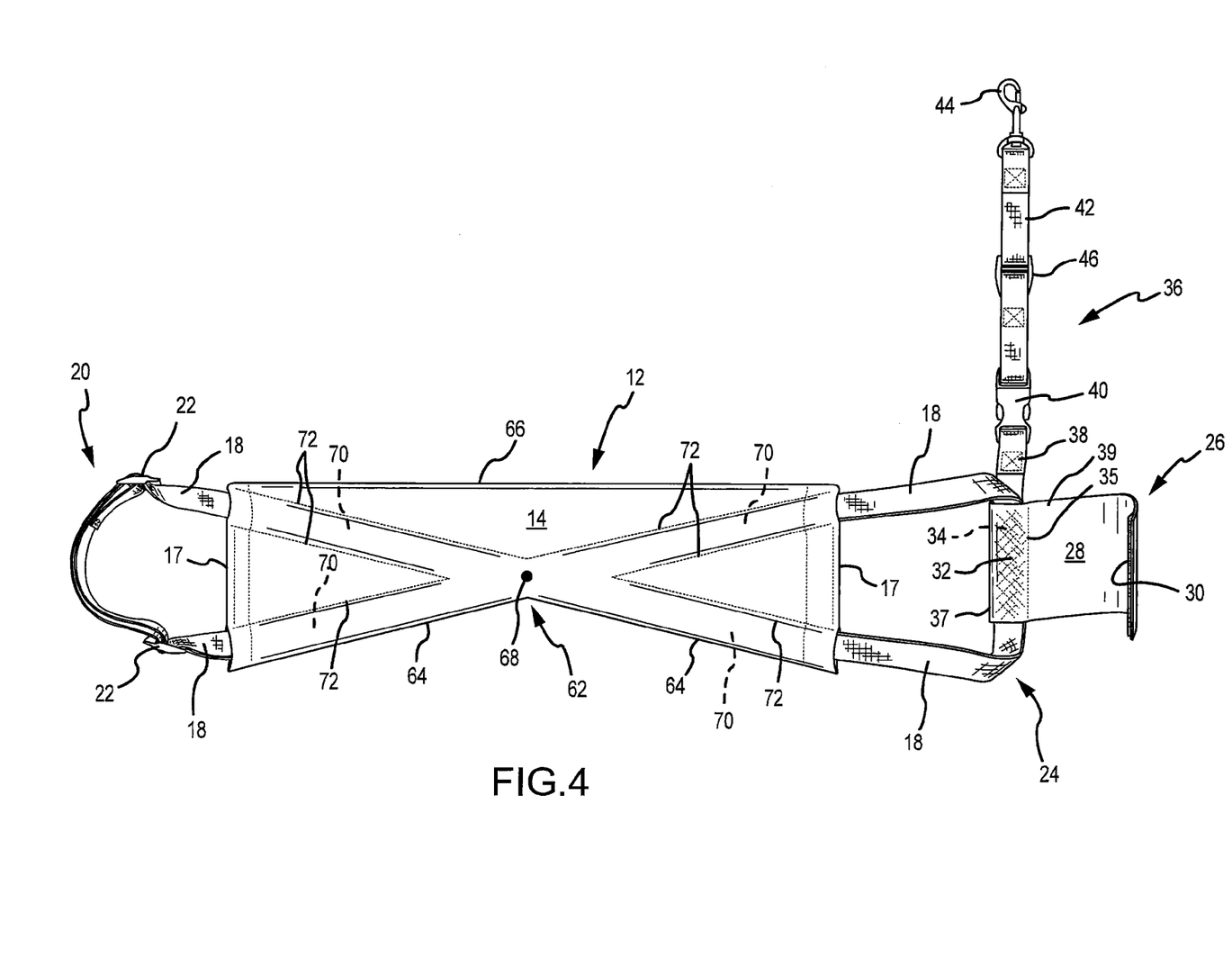
FIG. 4 is a plan view of a second embodiment of the present invention especially adapted for male animals.

Referring to FIG. 4, a second embodiment of the invention is shown. Like reference numbers in this embodiment correspond to the same structural elements disclosed above with respect to the first embodiment. The second embodiment is the same as the first embodiment, with the exception of the shape of the support pad 14, and the manner in which the primary support straps 18 are routed through the channels formed in the pad 14. In order to accommodate male genitalia of an animal outfitted with the harness, one of the side edges 64 of the support pad 14 has a notch or cut out 62 formed by the side edge 64 converging towards a center or middle point 68 on the pad 14. The opposite side edge 66 is straight as shown. Instead of the pair of substantially parallel routing channels 16, the routing channels in this embodiment are crossed to account for the presence of the notch 62. Accordingly, channels 70 are illustrated and are defined as extending between stitch lines 72. The straps 18 intersect at the center point 68 and pass over one another through their corresponding channel 70.

Figure 5:
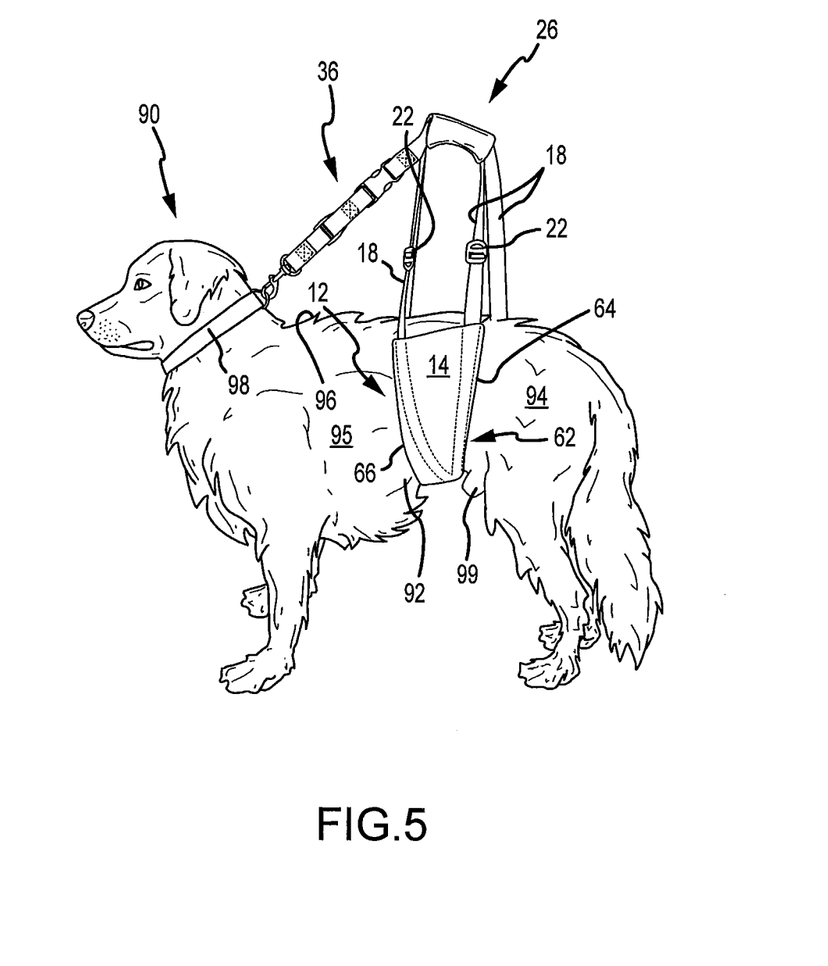
FIG. 5 is a perspective view of the second embodiment illustrating the manner in which the second embodiment may be secured to the animal to avoid contact with male genitalia.

Referring to FIG. 5, the second embodiment of the present invention is shown secured to a male dog wherein the sling is positioned such that the notch 62 faces the male genitalia 99. Thus, the sling does not make contact with the genitalia 99, yet the sling still adequately supports the animal by substantial contact of the sling with the portion of the abdomen 92 forward of the genitalia 99.

In accordance with the method of the present invention, support is provided to the hind portion or rear portion of the animal, while providing the owner with integral capability to restrain movement of the animal by the leash strap. In those circumstances when the animal requires a great amount of support, the owner may wish to stand as close to the animal as possible such that the lifting motion is most efficiently generated upwards without excessive strain on the owner. Of course, depending upon the size of the dog and the owner, accommodations can be made by the owner for a more comfortable position in which to locate the owner's body with respect to the animal. Since the length of the support straps are adjustable, as well as the length of the leash, the owner can determine the most comfortable position for the owner's arm 82, and hand 84.

When the animal desires to move, or when the owner wishes to encourage the animal to walk, the necessary amount of upward lifting support is provided by the owner by lifting upwards on the handle. In the event the animal attempts to walk too quickly or attempts to lunge forward, the leash strap will simultaneously convey this force to the owner's hand. Thus, without having to generate a separate and distinct rearward pulling motion, because the leash strap is already attached to the handle, there will be some inherent amount of restraint applied by the owner to the forward movement of the animal. Accordingly, it is desirable that the leash strap extend taut between the animal's collar and the handle. Particularly for animals who have just recently undergone surgery or who have sustained a debilitating injury, a quick set of steps or a lunge can jeopardize healing and therefore, the present invention provides the advantage that the animal is not able to generate a quick forward movement without the owner simultaneously feeling such quick forward movement in the hand that grasps the handle.

Yet another advantage of the present invention is that the harness is minimally intrusive and does not make multiple points of contact with the animal except for the unitary sling. The present invention requires no additional leg straps that have a tendency to disrupt the natural walking motion of the animal, as well as to make the harness inherently more difficult to secure to the animal.

Various geometric features of the present invention can be modified to best match the type of animal to be supported by the harness. For example, the width and length of the pad can be changed based upon the size of the animal, as well as the size and length of the support straps. As mentioned, in the event the owner only wishes to apply an upward supporting force to the animal, the leash strap may be disconnected by unbuckling the buckle 40.

Although the harness of the present invention is illustrated as being secured to the animal around the abdomen for primary support of the rear portion of the animal, it shall be understood that the harness may also be secured to the animal in a more forward position in front of the abdomen and around the rib cage of the animal to provide either more balanced support between the front and hind legs, or even to provide primary support for the front legs. In the event the harness is moved to the more forward position, the length of the leash strap can be shortened so that simultaneous control is still achieved for both lifting support and control of forward movement of the animal.

While the present invention has been described above with respect to various preferred embodiments, it shall be understood that various other changes and modifications to the invention can be made in accordance with the scope of the claims appended hereto.

What is claimed is:

1. An animal support apparatus comprising:
   a sling having first and second ends and opposing side edges;
   a pair of support straps secured to said sling and extending beyond a length of said sling, said support straps terminating in a pair of loops, one loop attached to said first end of said sling, and another loop attached to said second end of said sling, a pair of strap length adjustors secured to said support straps to adjust lengths of the supports straps;
   said loops being secured in a handle connected to one of said straps, said handle including a hand pad;
   a leash strap having a first end and a second end, said first end attached to one of said straps;
   a notch extending along substantially a length of the sling and converging towards
   a center of the sling; and
   wherein a substantial length of said leash strap, a substantial length of said supporting straps, and an upper surface of a back of the animal form a substantially triangular shape when said apparatus is secured to the animal; and
   said sling includes a pair of routing channels formed therein and arranged in a crossing pattern, wherein one strap of said plurality of straps is routed through a corresponding channel of said plurality of channels, and another strap of said plurality of straps is routed through another corresponding channel of said plurality of routing channels.

2. An apparatus, as claimed in claim 1, wherein:
   said second end of said leash strap includes a snap hook connected thereto.

3. An apparatus, as claimed in claim 1, further including:
   at least one routing channel formed in said sling adjacent one of said side edges, one strap of said pair of straps being routed through said at least one channel.

4. An animal support apparatus comprising:
   a sling having first and second ends and opposing side edges wherein the sling resides around an abdomen of the animal such that said sling terminates at a first side edge in front of hips of the animal, and said sling terminates at a second opposite side edge behind a rib cage of the animal on the abdomen;
   a pair of support straps secured to said sling and extending beyond a length of said sling said support straps extending upward and symmetrically from lateral sides of the animal;
   a pair of strap length adjustors secured to said support straps to adjust lengths of the supports straps;
   a leash strap having a first end and a second end, said first end located adjacent ends of the support straps and said second end secured to an upper portion of a device worn by the animal, the device being separated from said sling, and said leash strap having a length with at least a portion thereof extending over a back of the animal;
   a hand pad attached to at least one support strap of said pair of support straps, said hand pad having a channel for receiving said at least one support strap, first securing material attached to a first portion of said hand pad and second securing material attached to a second portion of said hand pad, wherein when the hand pad is formed in a loop, said first and second securing materials contact one another and remain attached;

wherein at least a portion of said leash strap, a portion of said supporting straps, and an upper surface of the back of the animal form a substantially triangular shape when said apparatus is secured to the animal; and said sling includes a pair of routing channels formed therein and arranged in a crossing pattern, and wherein one strap of said plurality of straps is routed through a corresponding channel of said plurality of channels, and another strap of said plurality of straps is routed through another corresponding channel of said plurality of routing channels.

5. An animal support apparatus, as claimed in claim 4, wherein:

said support straps terminate in a pair of loops, one loop attached to said first end of said sling, and another loop attached to said second end of said sling, said loops being secured in said hand pad, and said sling extending below said handle when said apparatus is in use.

* * * * *